(12) United States Patent
Yoo

(10) Patent No.: US 6,885,424 B2
(45) Date of Patent: Apr. 26, 2005

(54) ARRAY SUBSTRATE FOR IN-PLANE SWITCHING LIQUID CRYSTAL DISPLAY DEVICE HAVING MULTI-DOMAIN

(75) Inventor: Jang-Jin Yoo, Seocho-gu (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/201,785

(22) Filed: Jul. 25, 2002

(65) Prior Publication Data

US 2003/0020861 A1 Jan. 30, 2003

(30) Foreign Application Priority Data

Jul. 27, 2001 (KR) ........................ 2001-45473

(51) Int. Cl.$^7$ ..................... G02F 1/1343; G02F 1/136; G02F 1/1333; H01L 29/04
(52) U.S. Cl. ................. 349/141; 349/42; 349/138; 257/59
(58) Field of Search ................ 349/42, 43, 138, 349/141; 438/149; 257/59, 72

(56) References Cited

U.S. PATENT DOCUMENTS

| | | | |
|---|---|---|---|
| 5,598,285 A | 1/1997 | Kondo et al. | 349/39 |
| 5,745,207 A | 4/1998 | Asada et al. | 349/141 |
| 5,838,037 A | 11/1998 | Masutani et al. | 257/296 |
| 5,946,060 A | 8/1999 | Nishiki et al. | 349/48 |
| 5,990,987 A | 11/1999 | Tanaka | 349/43 |
| 6,028,653 A | 2/2000 | Nishida | 349/141 |
| 6,097,454 A | 8/2000 | Zhang et al. | 349/43 |
| 6,226,061 B1 * | 5/2001 | Tagusa | 349/84 |
| 6,281,957 B1 * | 8/2001 | Oh et al. | 349/141 |
| 6,287,899 B1 * | 9/2001 | Park et al. | 438/149 |
| 2002/0008829 A1 * | 1/2002 | Matsumoto | 349/141 |
| 2002/0033922 A1 * | 3/2002 | Hidehira et al. | 349/141 |
| 2002/0118330 A1 * | 8/2002 | Lee | 349/141 |

FOREIGN PATENT DOCUMENTS

| | | |
|---|---|---|
| JP | 09-005764 | 1/1997 |
| JP | 09-073101 | 3/1997 |
| JP | 09-101538 | 4/1997 |
| JP | 09-105908 | 4/1997 |

OTHER PUBLICATIONS

R. Kiefer et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95; pp. 577–580.
M. Ohta et al.; "Development of Super–TFT–LCDs with In–Plane Switching Display Mode"; Asia Display '95; pp. 707–710.
S. Matsumoto et al.; Display Characteristics of In–Plane Switching (IPS) LCDs and a Wide–Viewing–Angle 14.5–in. OPS TFT–LCD; Euro Display '96; pp. 445–448.
H. Wakemoto et al.; "An Advanced In–Plane Switching Mode TFT–LCD"; SID 97 Digest; pp. 929–932.
S.H. Lee et al.; High–Transmittance, Wide–Viewing–Angle Nematic Liquid Crystal Display Controlled by Fringe–Field Switching; Asia Display '98; pp. 371–374.
S. Endoh et al.; "Advanced 18.1–inch Diagonal Super–T-FT–LCDs with Mega Wide Viewing Angle and Fast Response Speed of 20ms"; IDW '99; pp. 187–190.

* cited by examiner

Primary Examiner—Tarifur R. Chowdhury
(74) Attorney, Agent, or Firm—McKenna Long & Aldridge LLP

(57) ABSTRACT

An array substrate for an in-plane switching liquid crystal display device includes a substrate, a gate line and a data line on the substrate, wherein the gate line and the data line cross each other to define a pixel region. A thin film transistor is electrically connected to the gate line and the data line. A common line is parallel to the gate line. A plurality of common electrodes perpendicularly extend from the common line. A plurality of pixel electrodes alternate with the plurality of common electrodes. An overcoat layer is formed over the plurality of common electrodes and the plurality of pixel electrodes, the overcoat layer having a plurality of holes.

16 Claims, 11 Drawing Sheets on state

ARRAY SUBSTRATE FOR IN-PLANE SWITCHING LIQUID CRYSTAL DISPLAY DEVICE HAVING MULTI-DOMAIN

This application claims the benefit of Korean Patent Application No. 2001-45473, filed on Jul. 27, 2001, which is hereby incorporated by reference for all purposes as if fully set forth herein.

BACKGROUND OF THE INVENTION

1. Field of the Invention

The present invention relates to a liquid crystal display (LCD) device and more particularly, to an array substrate for an in-plane switching liquid crystal display (IPS LCD) device.

2. Discussion of the Related Art

In general, a liquid crystal display (LCD) device has an upper substrate and a lower substrate, which are spaced apart and face each other, and a liquid crystal layer disposed between the upper and lower substrates. Each of the substrates includes an electrode and the electrodes of each substrate also face each other. The LCD device uses an optical anisotropy of liquid crystal and produces an image by controlling light transmissivity by varying the arrangement of liquid crystal molecules, which are arranged by an electric field.

As it has a high resolution and can display an excellent moving image, an LCD device, which includes thin film transistors and pixel electrodes arranged in a matrix form, is widely used. The LCD device is referred to as an active matrix liquid crystal display (AMLCD).

A related art liquid crystal display (LCD) device will be described hereinafter more in detail with reference to FIG. 1. FIG. 1 is an exploded perspective view illustrating a conventional LCD device. The conventional LCD device 11 has upper and lower substrates 5 and 22, which are spaced apart and face each other, and also has a liquid crystal layer 14 to be interposed between the upper substrate 5 and the lower substrate 22.

A gate line 13 is formed horizontally in the context of the figure on the inside of the lower substrate 22 and a data line 15 is formed vertically in the context of the figure on the inside of the lower substrate 22. The gate line 13 and the data line 15 cross each other to define a pixel area "P". A thin film transistor "T" is situated at the crossing of the gate line 13 and the data line 15. A pixel electrode 17, which is electrically connected to the thin film transistor "T", is formed in the pixel area "P". The pixel electrode 17 is made of a transparent conductive material such as Indium-Tin-Oxide (ITO) or Indium Zinc Oxide (IZO).

Next, a black matrix 6, which has an opening corresponding to the pixel electrode 17, is formed on the inside of the upper substrate 5. A color filter 7 corresponding to the opening of the black matrix 6 is formed on the black matrix 6. The color filter 7 includes three colors: red (R), green (G) and blue (B). Each color corresponds to a respective pixel electrode 17. Subsequently, a transparent common electrode 18 is formed on the color filter 7.

In the related art LCD device of FIG. 1, when voltage is applied to the pixel electrode 17 and the common electrode 18, an electric field is induced between the pixel electrode 17 and the common electrode 18 in a direction perpendicular to the upper and lower substrates 5 and 22. Molecules of the liquid crystal layer 14 are arranged by the electric field and light is emitted through the arranged liquid crystal layer 14 from a back light (not shown) disposed below the conventional LCD device, so that pictures are displayed.

The conventional LCD device having the above-mentioned structure, in which the liquid crystal layer is driven by the electric field perpendicular to the upper and lower substrates, has a high transmittance and a high aperture ratio, and the common electrode of the upper substrate is grounded so that breaking of the device due to static electricity is prevented.

The conventional LCD device, generally, uses twisted nematic (TN) mode liquid crystal, the orientation of which is parallel to substrates and is continuously twisted from one substrate to another substrate by 90 degrees.

FIGS. 2A and 2B are schematic views conceptually showing operation modes of a related art twisted nematic liquid crystal display (TNLCD) device. The liquid crystal has positive dielectric anisotropy, and is arranged in parallel to the direction of the electric field.

In FIG. 2A, when voltage is not applied, orientation of the long axis of the liquid crystal layer 14 is parallel to substrates 22 and 5, and molecules of the liquid crystal layer 14 are continuously twisted from the lower substrate 22 to the upper substrate 5 by 90 degrees.

In FIG. 2B, when voltage is applied to the pixel and common electrodes 17 and 18, the electric field, which is perpendicular to the lower and upper substrates 22 and 5, is induced between the lower and upper substrate 22 and 5, and molecules of the liquid crystal layer 14 are arranged in parallel to the electric field except for molecules of the liquid crystal layer 14 close to the pixel and common electrodes 17 and 18. At this time, the liquid crystal layer, generally, has molecules twisted at an extreme value of 90 degrees.

However, the above-mentioned liquid crystal display device, in which an electric field is induced perpendicular to the substrates and which includes molecules of the liquid crystal layer parallel to the electric field, has a disadvantage of a narrow viewing angle. To overcome the narrow viewing angle, an in-plane switching (IPS) LCD device was developed. The IPS LCD device implements an electric field that is parallel to the substrates, which is different from the TNLCD device. A detailed explanation of a conventional IPS LCD device and its operation modes will be provided with reference to the following figures.

FIG. 3 is a schematic cross-sectional view of a related art in-plane switching liquid crystal display device. As shown in FIG. 3, the upper and lower substrates 32 and 30 are spaced apart from each other, and a liquid crystal layer 33 is interposed therebetween. The upper and lower substrates 32 and 30 are referred to as a color filter substrate and an array substrate, respectively. Pixel and common electrodes 34 and 36 are disposed on the lower substrate 30. The pixel and common electrodes 34 and 36 are parallel with each other and spaced apart from each other. Molecules of the liquid crystal layer 33 are aligned by a lateral electric field between the pixel and common electrodes 34 and 36.

FIGS. 4A and 4B are views illustrating operations of the liquid crystal for IPS mode at on and off states of the applied voltage. FIG. 4A conceptually illustrates "off state" operation modes for a related art IPS LCD device. In the off state, the long axis of the liquid crystal layer 33 maintains an initial arrangement, which is made by a method such as a rubbing. The pixel and common electrodes 34 and 36 are parallel with each other.

FIG. 4B conceptually illustrates "on state" operation modes for a related art IPS LCD device. In the on state, an in-plane electric field 35, which is parallel to the surface of the lower substrate, is generated between the pixel and the common electrodes 34 and 36. The pixel electrode 34 and common electrode 36 are formed together on the lower substrate for this reason. Thereby, molecules of the liquid crystal layer 33 are aligned such that the long axes thereof are parallel to the substrates and perpendicular to the pixel and common electrodes 34 and 36.

FIGS. 5A and 5B are schematic plan views conceptually showing operation modes of a related art in-plane switching liquid crystal display device. Here, arrow 41 of FIG. 5A and 41a of FIG. 5B show a direction of the long axis of the liquid crystal. In the off state of FIG. 5A, the long axis of the liquid crystal has a definite angle with respect to the pixel and common electrodes 34 and 36, and maintains the angle. On the other side, in the on state of FIG. 5B, electric field 35 is formed in a direction perpendicular to the pixel and common electrodes 34 and 36. Then, the liquid crystal (not shown) turns clockwise, so that the long axis thereof coincides with the direction of the electric field 35. Here, the extreme value of the liquid crystal in the IPS LCD device is smaller than that in the TNLCD device.

As stated above, the IPS LCD device uses the lateral electric field 35 because the pixel and common electrodes 34 and 36 are formed on the same substrate. The IPS LCD device has a wide viewing angle and low color dispersion. Specifically, the viewing angle of the IPS LCD device is about 70 degrees in the directions up, down, right, and left. In addition, the fabricating processes of this IPS LCD device are simpler than other various LCD devices.

However, the IPS LCD device has a disadvantage of color shift according to a viewing angle. FIG. 6 is a chromaticity diagram according to a viewing angle of a related art in-plane switching liquid crystal display (IPS LCD) device. In FIG. 6, standard white light has coordinate values of about 0.329 and 0.333. The color shift results from birefringence of the liquid crystal, and this is also discussed in "Advanced 18.1-inch Diagonal Super-TFT-LCDs with Mega Wide Viewing Angle and Fast Response Speed of 10 ms" of S. Endow et al., page 187, IDW 99'.

On the other hand, FIG. 7 shows a diagram of transmittance versus a viewing angle according to gray level of a related art liquid crystal display device. In FIG. 7, the gray level is divided into 8 levels. In a first level, while the transmittance at the front part, i.e. a viewing angle of 0 degrees, is zero percent, the transmittance of a viewing angle of ±60 degrees is about 20 percent, which is larger than that of a fourth level. That is, when in the black mode of the first level, black shows at the viewing angle of 0 degrees, but white shows at the viewing angle of about ±60 degrees. Therefore, gray inversion occurs.

SUMMARY OF THE INVENTION

Accordingly, the present invention is directed to an array substrate for an in-plane switching liquid crystal display device that substantially obviates one or more of problems due to limitations and disadvantages of the related art.

An advantage of the present invention is to provide an array substrate for an in-plane switching liquid crystal display device that has a wide viewing angle.

Another advantage of the present invention is to provide an array substrate for an in-plane switching liquid crystal display device that has low dependence on color shift and gray inversion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching liquid crystal display device includes a substrate; a gate line and a data line on the substrate, wherein the gate line and the data line cross each other to define a pixel region; a thin film transistor being electrically connected to the gate line and the data line; a common line parallel to the gate line; a plurality of common electrodes perpendicularly extended from the common line; a plurality of pixel electrodes alternating with the plurality of common electrodes; and an overcoat layer over the plurality of common electrodes and the plurality of pixel electrodes, the overcoat layer having a plurality of holes.

In another aspect of the present invention, an array substrate for an in-plane switching liquid crystal display device includes a substrate; a gate line and a data line on the substrate, wherein the gate line and the data line cross each other to define a pixel region; a thin film transistor being electrically connected to the gate line and the data line; a common line parallel to the gate line; a plurality of common electrodes parallel to the common line; wherein the plurality of common electrodes are electrically connected to the common line, a plurality of pixel electrodes alternating with the plurality of common electrodes; and an overcoat layer over the plurality of common electrodes and the plurality of pixel electrodes, the overcoat layer having a plurality of holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

In an in-plane switching liquid crystal display device, the color shift or the gray inversion is caused by the birefringence of liquid crystal.

Figure 8A:
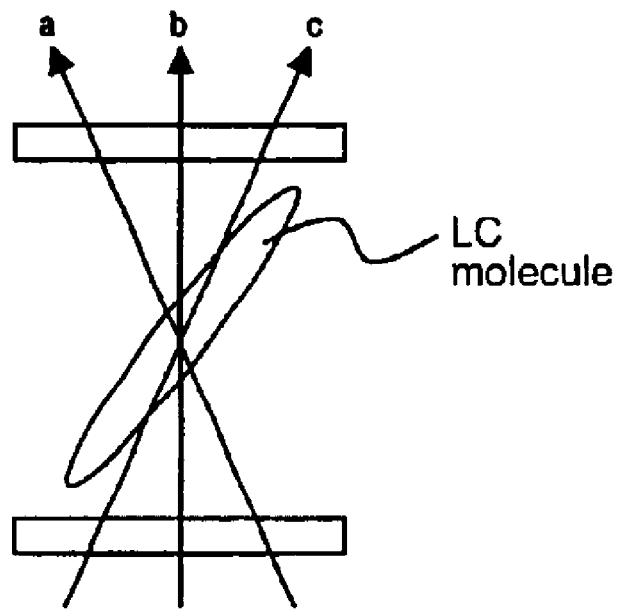
FIGS. 8A and 8B are schematic views showing path of light in single-domain and in multi-domain, respectively.
Figure 8B:
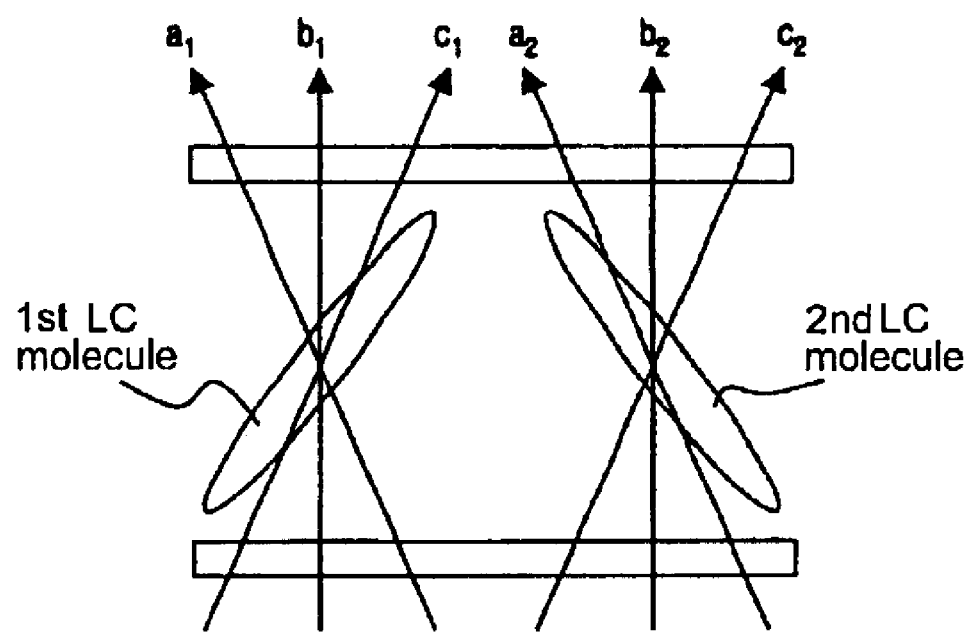

FIGS. 8A and 8B are schematic views showing the path of light in single-domain and in multi-domain, respectively. In single-domain shown in FIG. 8A, a liquid crystal molecule has different refractive indices according to each direction of a, b, and c. Therefore, a birefringence phenomenon appears in the liquid crystal molecule, and the quality of display changes according to viewing angles.

Meanwhile, FIG. 8B shows the path of light in multi-domain, particularly two domains. In FIG. 8B, a first liquid crystal and a second liquid crystal are symmetric with respect to the vertical line to the substrates. Moreover, $a_1$ and $a_2$ directions parallel to each other are symmetric with respect to $c_1$ and $c_2$ directions parallel to each other with respect to the vertical line to the substrates. A refractive index of the first liquid crystal molecule to the $a_1$ direction has a negative value of a refractive index of the second liquid crystal molecule to the $c_2$ direction. Similarly, a refractive index of the first liquid crystal molecule to the $c_1$ direction has a negative value of a refractive index of the second liquid crystal molecule to the $a_2$ direction. Accordingly, the refractive indices of the $a_1$ and $c_1$ directions compensate the refractive indexes of the $a_2$ and $c_2$ directions, respectively. Therefore, there is no birefringence phenomenon in the LCD device of FIG. 8B.

An array substrate for an in-plane switching liquid crystal display (IPS LCD) device, which has the above-stated multi-domain structure, will be described hereinafter more in detail with reference to the following figures.

Figure 9:
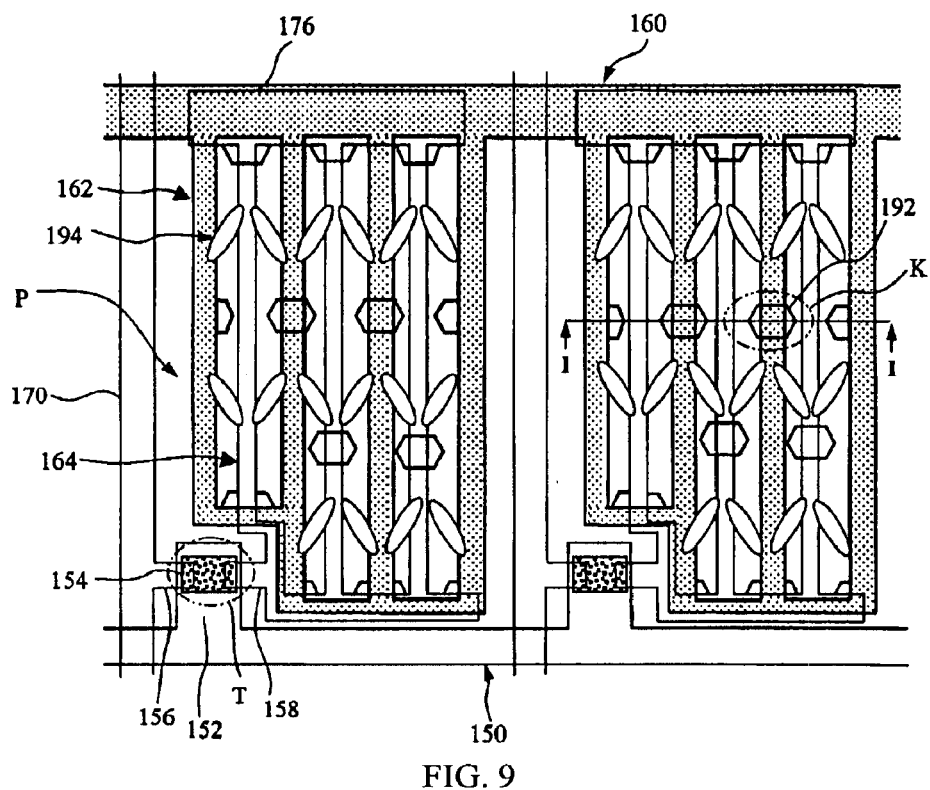
FIG. 9 is a plan view of an array substrate for a in-plane switching liquid crystal display (IPS LCD) device according to a first embodiment of the present invention.

FIG. 9 is a plan view of an array substrate for an in-plane switching liquid crystal display (IPS LCD) device according to a first embodiment of the present invention. In FIG. 9, a gate line 150 and a common line 160 parallel to each other are formed horizontally in the context of the figure. A data line 170 extends vertically in the context of the figure and crosses the gate line 150 to define a pixel area "P". At the crossing of the gate line 150 and the data line 170, a thin film transistor "T" is formed, which includes a gate electrode 152, a source electrode 156, and a drain electrode 158. The gate electrode 152 is connected to the gate line 150 and the source electrode 156 is connected to the data line 170. An active layer 154 is formed at the crossing. In the pixel area "P", a plurality of common electrodes 162 are extended from the common line 160, and the plurality of common electrodes 162 are parallel to the data line 170. Also, a plurality of pixel electrodes 164 are formed vertically with an alternating arrangement with the plurality of the common electrodes 162 in the pixel area "P". The plurality of pixel electrodes 164 are connected to the drain electrode 158.

Next, an overcoat layer (not shown) covers the plurality of common electrodes 162 and the plurality of pixel electrodes 164. The overcoat layer has holes 192 of a hexagonal shape. The holes 192 may also take a shape such as a circle, a triangle, or a quadrangle. The overcoat layer may be made of a photosensitive material such as benzocyclobutene (BCB) or acrylic resin. The holes 192 are disposed over the common electrodes 162 or the pixel electrodes 164. The holes 192 over the common electrodes 162 make a first line and the holes 192 over the pixel electrodes 164 make a second line. The first line and the second line are spaced apart from each other. The holes 192 cause a fringe field between the common electrode 162 and the pixel electrode 164 when voltage is applied to the electrodes 162 and 164.

Subsequently, liquid crystal 194 is situated over the overcoat layer, and the liquid crystal 194 has positive dielectric anisotropy. The liquid crystal 194 was first arranged in a direction of the common electrode 162 and the pixel electrode 164, but it is not shown in FIG. 9.

On the other hand, the transmission axes of polarizers (not shown), which are arranged outside of the liquid crystal display device, are parallel and perpendicular to the electrodes 162 and 164, respectively.

In FIG. 9, when voltage is applied to the common and pixel electrodes 162 and 164, a fringe field is induced between the common and pixel electrodes 162 and 164, and the liquid crystal 194 is arranged in a direction parallel to the common and pixel electrodes 162 and 164.

Figure 10:
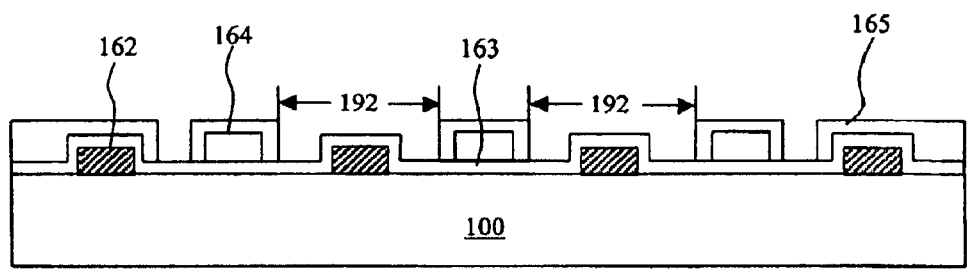
FIG. 10 is a cross-sectional view along the line I—I of FIG. 9.

FIG. 10 is a cross-sectional view along the line I—I of FIG. 9. As shown in the figure, the plurality of common electrodes 162 are formed on a substrate 100 and a gate insulator 163 covers the plurality of common electrodes 162. The plurality of pixel electrodes 164 are formed on the gate insulator 163, alternating with the plurality of the common electrodes 162. Next, an overcoat layer 165 is formed on the plurality of pixel electrodes 164 and covers the plurality of pixel electrodes 164. The overcoat layer 165 has holes 192, which are located over the common electrodes 162. The overcoat layer 165, desirably, has a smaller dielectric constant than the liquid crystal 194 of FIG. 9. Therefore, in the present invention, the dielectric constant of the overcoat layer 165 is less than about 5.

Figure 1:
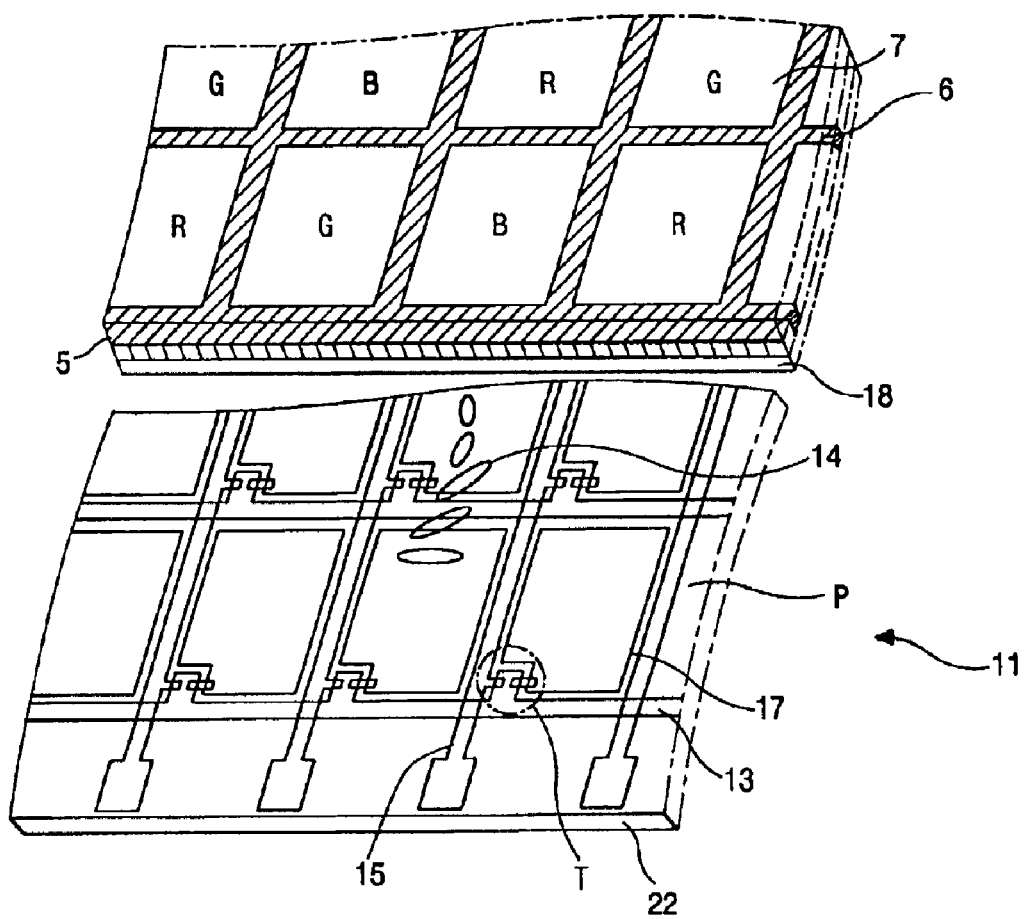
FIG. 1 is an exploded perspective view illustrating a related art liquid crystal display (LCD) device.
Figure 2A:
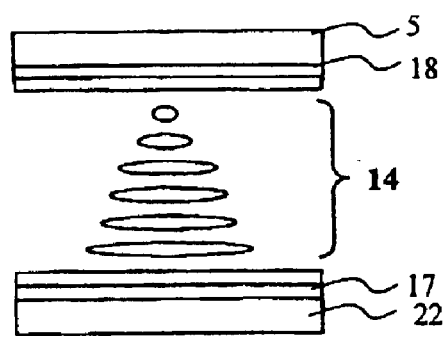
FIGS. 2A and 2B are schematic views conceptually showing operation modes of a related art twisted nematic (TN) mode liquid crystal display (LCD) device.
Figure 2B:
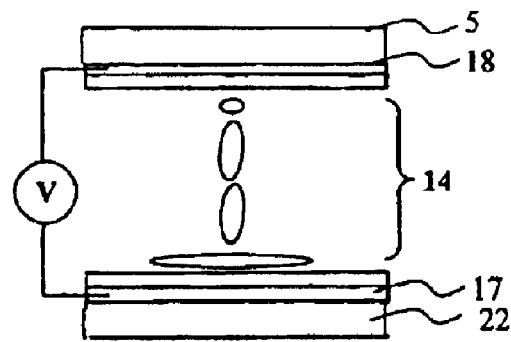
Figure 3:
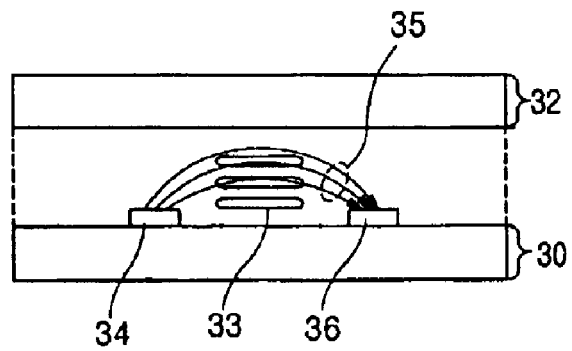
FIG. 3 is a schematic cross-sectional view of a related art in-plane switching liquid crystal display (IPS LCD) device.
Figure 4A:
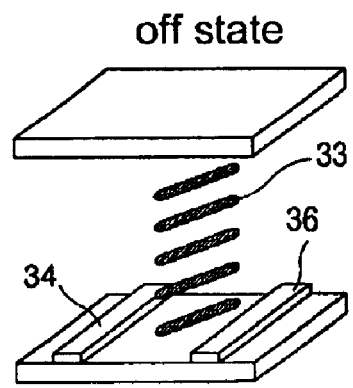
FIGS. 4A and 4B are schematic views conceptually showing operation modes of a related art in-plane switching liquid crystal display (IPS LCD) device.
Figure 4B:
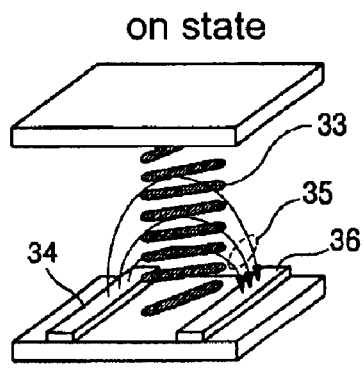
Figure 5A:
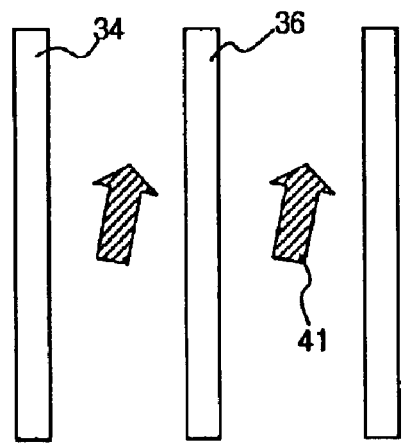
FIGS. 5A and 5B are schematic plan views conceptually showing operation modes of a related art in-plane switching liquid crystal display (IPS LCD) device.
Figure 5B:
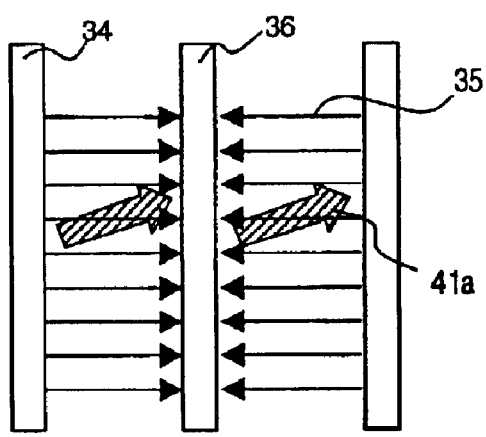
Figure 6:
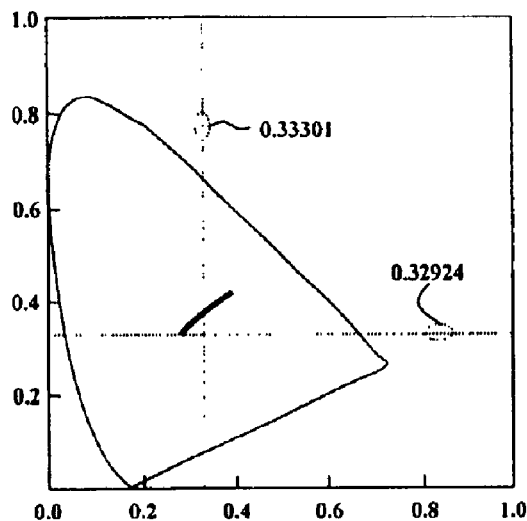
FIG. 6 is a chromaticity diagram according to a viewing angle of a related art in-plane switching liquid crystal display (IPS LCD) device.
Figure 7:
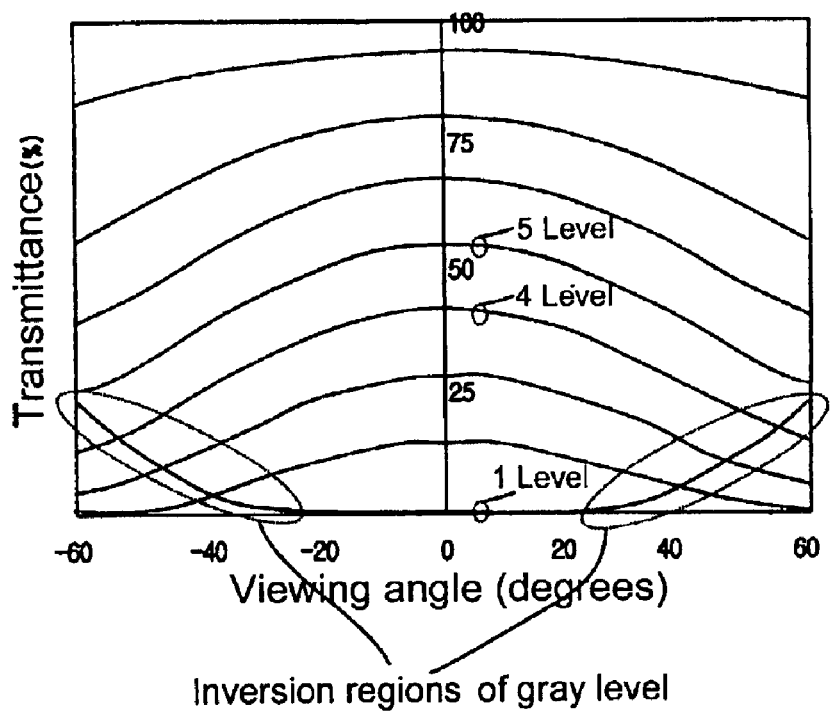
FIG. 7 is a diagram of transmittance versus a viewing angle according to gray level of a related art liquid crystal display (IPS LCD) device.
Figure 11:
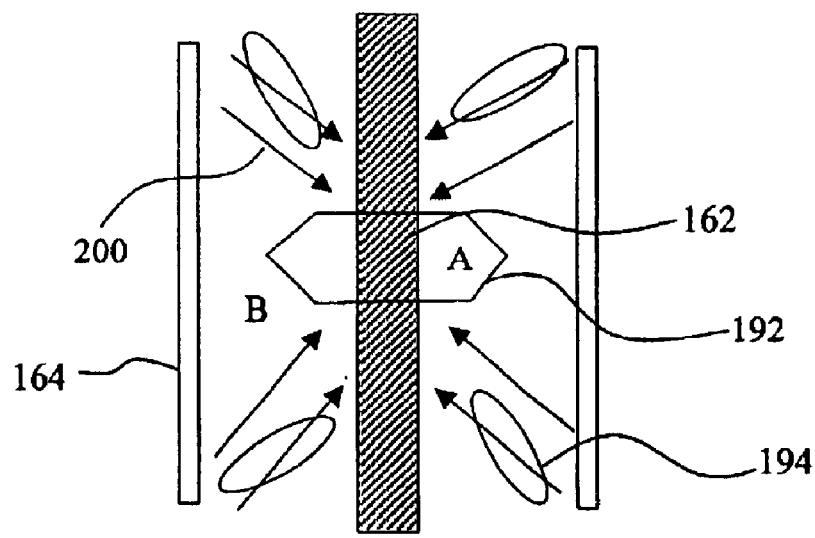
FIG. 11 is a plan view magnifying "K" of FIG. 9.

FIG. 11 is a plan view magnifying "K" of FIG. 9, and shows a fringe field formed by the holes of the overcoat layer. In FIG. 1, the overcoat layer (not shown) is divided into a first region "A" corresponding to the hole 192 and a second region "B" except for the first region "A". As the overcoat layer (not shown) has a smaller dielectric constant than the liquid crystal 194, electric lines of force in the second region "B" become denser than in the first region "A". Electric field 200 is bent according to the boundary of the hole 192, and distorted electric field 200, i.e. fringe field, is induced between the holes 192. The fringe field 200 centers the hole 192, and is substantially symmetric with respect to the common electrode 162 and a line perpendicular to the common electrode 162.

When the electric field 200 is induced, the liquid crystal 194 is rotated by the force of the electric field 200 to be parallel to the direction of the electric field 200. Accordingly, four domains, which include the liquid crystal 194 arranged differently from one another, are formed centering the hole 192.

Figure 12:
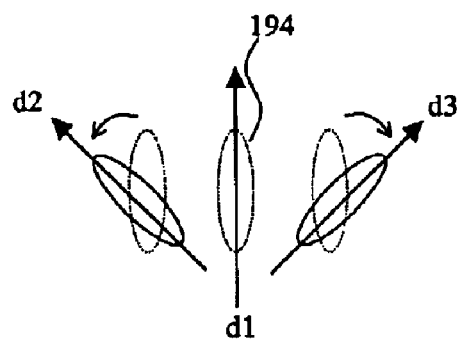
FIG. 12 is a schematic view showing the relationship between the electric field and the liquid crystal in a first embodiment of the present invention.

FIG. 12 shows the relationship between the electric field and the liquid crystal in the first embodiment. FIG. 12 is similar to the upper region of the hole of FIG. 11. Here, a first arrow $d_1$ corresponds to a direction of the common electrode 162 or the pixel electrode 164 having a hole 192 of FIG. 11 thereon. A second arrow $d_2$ and a third arrow $d_3$ show directions of the electric field induced substantially symmetrically with respect to the first arrow $d_1$. Therefore, when voltage is applied to the electrodes 162 and 164, the liquid crystal 194, which first is parallel to the first arrow $d_1$, is arranged in a direction parallel to the second and third arrows $d_2$ and $d_3$. At this time, the degree of freedom of the liquid crystal 194 is 2.

As stated above, in the present invention, a multi-domain is formed, in each of which the liquid crystal is arranged differently, and thus color shift and gray inversion according to the viewing angle decrease.

Figure 13:
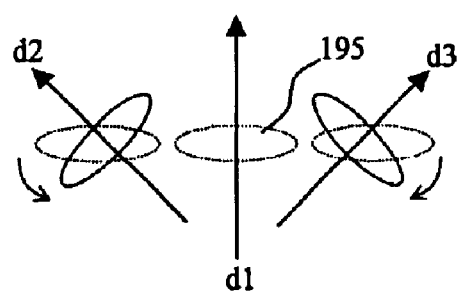
FIG. 13 is a schematic view showing the relationship between the electric field and the liquid crystal having negative dielectric anisotropy in a first embodiment of the present invention.

On the other hand, in the first embodiment, the liquid crystal may have negative dielectric anisotropy. FIG. 13 shows the relationship between the electric field and the liquid crystal having negative dielectric anisotropy in the first embodiment of the present invention. FIG. 13 also corresponds to the upper region of the hole of FIG. 11. First, the liquid crystal 195 is arranged in a direction perpendicular to the first arrow $d_1$, respectively. When voltage is applied, the liquid crystal 195 is arranged in a direction perpendicular to the second and third arrows $d_2$ and $d_3$, respectively. The liquid crystal 195 is substantially symmetric with respect to the first arrow $d_1$.

Figure 14:
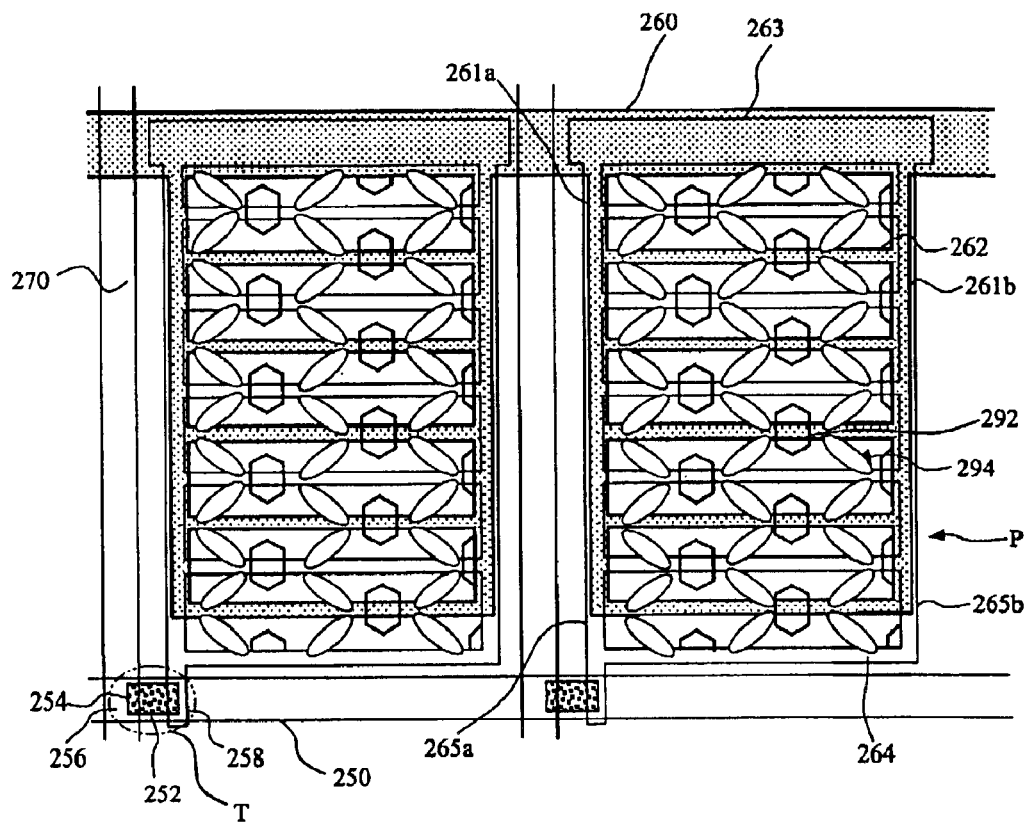
FIG. 14 is a plan view of an array substrate for an in-plane switching liquid crystal display (IPS LCD) device according to a second embodiment of the present invention.

FIG. 14 is a plan view of an array substrate for an in-plane switching liquid crystal display (IPS LCD) device according to a second embodiment of the present invention. In FIG. 14, a gate line 250 is formed horizontally in the context of the figure. A data line 270 extends vertically in the context of the figure and crosses the gate line 250 to define a pixel area "P". At the crossing of the gate line 250 and the data line 270, a thin film transistor "T" is formed, which includes a gate electrode 252, a source electrode 256, and a drain electrode 258. Here, the gate electrode 252 is a part of the gate line 250 and the source electrode 256 is a part of the data line 270. An active layer 254 is formed at the crossing.

Next, a common line 260 parallel to the gate line 250 is formed, and a first vertical part 261a and a vertical second part 261b are extended vertically from the common line 260. In the pixel area "P", a plurality of common electrodes 262 are formed horizontally in the context of the figure spaced from each other. The plurality of common electrodes 262 are connected to the first and second vertical parts 261a and 261b. Also, a horizontal part 263, a plurality of pixel electrodes 264, a third vertical part 265a, and a fourth vertical part 265b are formed. The horizontal part 263 is parallel to the common line 260 and overlaps the common line 260. The third and fourth vertical parts 265a and 265b are extended from the common line 260, and the plurality of pixel electrodes 264, which are connected to the third and fourth vertical parts 265a and 265b, are formed horizontally in the context of the figure with an alternating arrangement with the plurality of the common electrodes 262. The third vertical part 265a is connected to the drain electrode 258.

Next, an overcoat layer (not shown) covers the plurality of common electrodes 262 and the plurality of pixel electrodes 264. The overcoat layer has holes 292 of a hexagonal shape, and the holes 292 may take shapes such as a circle, a triangle, or a quadrangle. The overcoat layer may be made of a photosensitive material such as benzocyclobutene (BCB) or acrylic resin. The holes 292 are disposed over the common electrodes 262 or the pixel electrodes 264. The holes 292 over the common electrodes 262 make a first line and the holes 292 over the pixel electrodes 264 make a second line. The first line and the second line are spaced apart form each other. The holes 292 cause a fringe field to occur between the common electrode 262 and the pixel electrode 264 when voltage is applied to the electrodes 262 and 264.

Subsequently, liquid crystal 294 is situated over the overcoat layer, and the liquid crystal 294 has positive dielectric anisotropy. The liquid crystal 294 was first arranged in a direction of the common electrode 262 and the pixel electrode 264, but it is not shown in FIG. 14.

In FIG. 14, when voltage is applied to the common and pixel electrodes 262 and 264, a fringe field is induced between the common and pixel electrodes 262 and 264, and the liquid crystal 294 is arranged in a direction parallel to the common and pixel electrodes 262 and 264.

Figure 15:
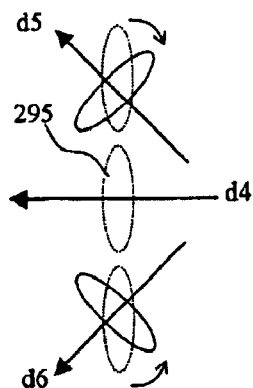
FIG. 15 is a schematic view showing the relationship between the electric field and the liquid crystal of a second embodiment of the present invention.

FIG. 15 shows the relationship between the electric field and the liquid crystal in the second embodiment. The liquid crystal 295 has a negative dielectric anisotropy. Here, a first arrow $d_4$ corresponds to the common electrode 262 or the pixel electrode 264 having a hole 292 of FIG. 14 thereon. A second arrow $d_5$ and a third arrow $d_6$ show directions of the electric field induced substantially symmetrically with respect to the first arrow $d_4$. Therefore, when voltage is applied to the electrodes 262 and 264, the liquid crystal 294, which first is perpendicular to the first arrow $d_4$, is arranged in a direction perpendicular to the second and third arrows $d_5$ and $d_6$. At this time, the degree of freedom of the liquid crystal 294 is 2.

Figure 16:
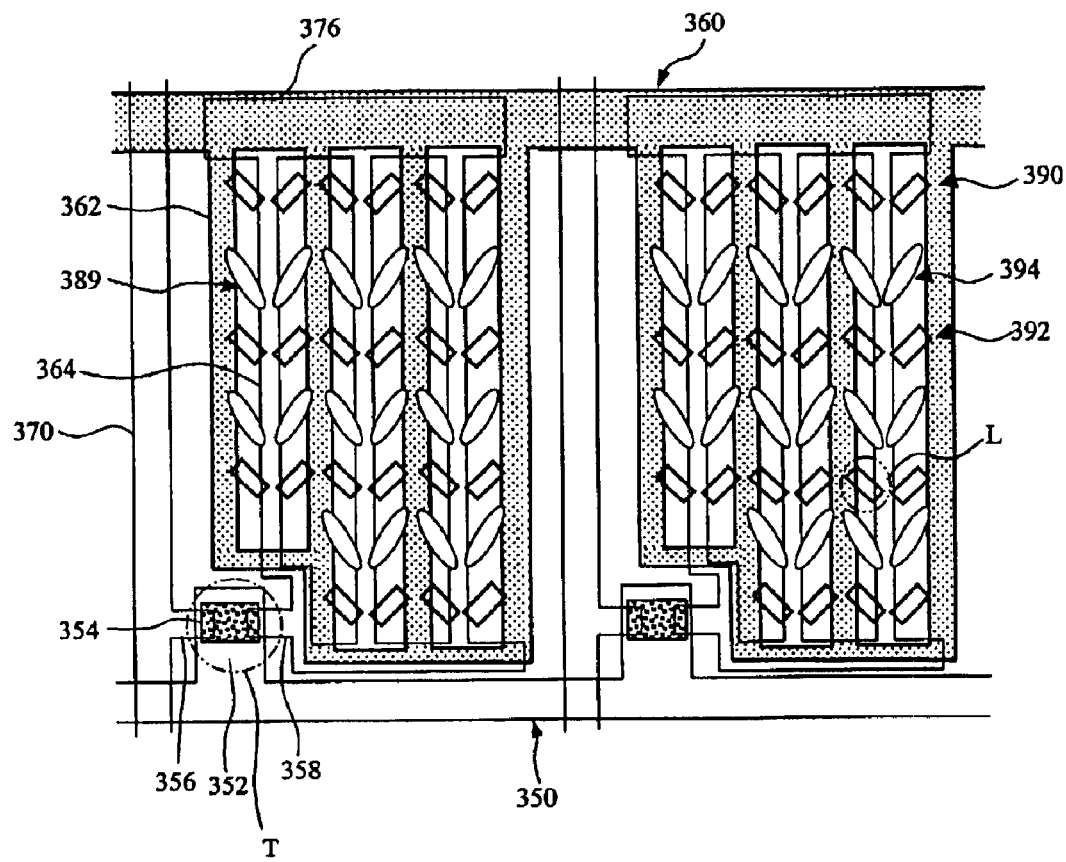
FIG. 16 is a plan view of an array substrate for a in-plane switching liquid crystal display (LCD) device according to a third embodiment of the present invention.

Next, FIG. 16 is a plan view of an array substrate for a in-plane switching liquid crystal display (LCD) device according to a third embodiment of the present invention. In FIG. 16, a gate line 350 and a common line 360 parallel to each other are formed horizontally in the context of the figure. A data line 370 extends vertically in the context of the figure and crosses the gate line 350 to define a pixel area "P". At the crossing of the gate line 350 and the data line 370, a thin film transistor "T" is formed, which includes a gate electrode 352, a source electrode 356, and a drain electrode 358. The gate electrode 352 is connected to the gate line 350 and the source electrode 356 is connected to the data line 370. An active layer 354 is formed at the crossing. In the pixel area "P", a plurality of common electrodes 362 are extended from the common line 360, and the plurality of common electrodes 362 are parallel to the data line 370. Also, a plurality of pixel electrodes 364 are formed vertically with an alternating arrangement with the plurality of the common electrodes 362 in the pixel area "P". The plurality of pixel electrodes 364 are connected to the drain electrode 358.

Next, an overcoat layer (not shown) covers the plurality of common electrodes 362 and the plurality of pixel electrodes 364. The overcoat layer has holes 392 of a shape such as a quadrangle. The overcoat layer may be made of a photosensitive material such as benzocyclobutene (BCB) or acrylic resin. The holes 392 are disposed between the common electrodes 362 and the pixel electrodes 364, and have a length along a first direction and a width. Here, the first direction is inclined with respect to the common electrodes 362 and the pixel electrodes 364. The holes 392 are substantially symmetric with respect to the pixel electrodes 364 and the common electrodes 362.

Subsequently, liquid crystal 394 is situated over the overcoat layer, and the liquid crystal 394 has positive dielectric anisotropy. The liquid crystal 394 was first arranged in a direction of the common electrode 362 and the pixel electrode 364, but it is not shown in FIG. 16.

In FIG. 16, when voltage is applied to the common and pixel electrodes 362 and 364, electric field is induced in a direction parallel to the first direction between the common and pixel electrodes 362 and 364, and the liquid crystal 394 is arranged in a direction of the electric field, that is in the first direction.

Figure 17:
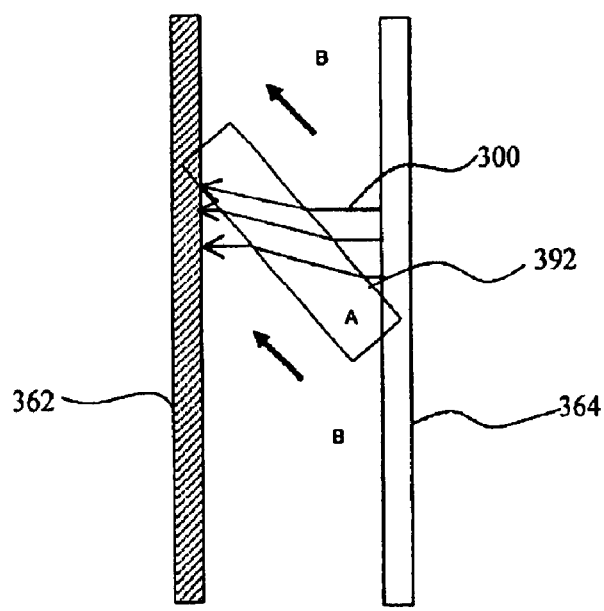
FIG. 17 is a plan view magnifying "L" of FIG. 16.

FIG. 17 is a plan view magnifying "L" of FIG. 16, and shows the electric field induced by the holes of the overcoat layer. In FIG. 17, the overcoat layer (not shown) is divided into a first region "A" corresponding to the hole 392 and a second region "B" except for the first region "A". Here, electric lines of force in the first region "A" become denser than in the second region "B", and the electric lines of force in the first region "A" incline to the long direction of the hole 392. As the liquid crystal (not shown) has a positive dielectric anisotropy, the liquid crystal is arranged in a direction parallel to the electric field 300.

Figure 18:
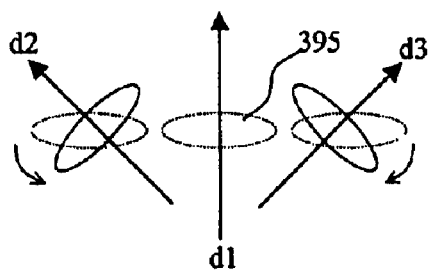
FIG. 18 is a schematic view showing the relationship between the electric field and the liquid crystal of a third embodiment of the present invention.

On the other hand, like the first embodiment, the liquid crystal may have negative dielectric anisotropy. FIG. 18 shows the relationship between the electric field and the liquid crystal having negative dielectric anisotropy in the third embodiment of the present invention. Here, a first arrow $d_1$ corresponds to the common electrode 362 or the pixel electrode 364 having a hole 392 of FIG. 16 thereon. A second arrow $d_2$ and a third arrow $d_3$ show directions of the electric field induced substantially symmetrically with respect to the first arrow $d_1$. When voltage is applied, the liquid crystal 395, which first is perpendicular to the first arrow $d_1$, is arranged in a direction perpendicular to the second and third arrows $d_2$ and $d_3$, respectively. The liquid crystal 395 is substantially symmetric with respect to the first arrow $d_1$.

In the third embodiment, as there is no disclination from a fringe field, and aperture ratio and brightness increase. Also, response time is short and force of restitution is large because of a strong fringe field.

Figure 19:
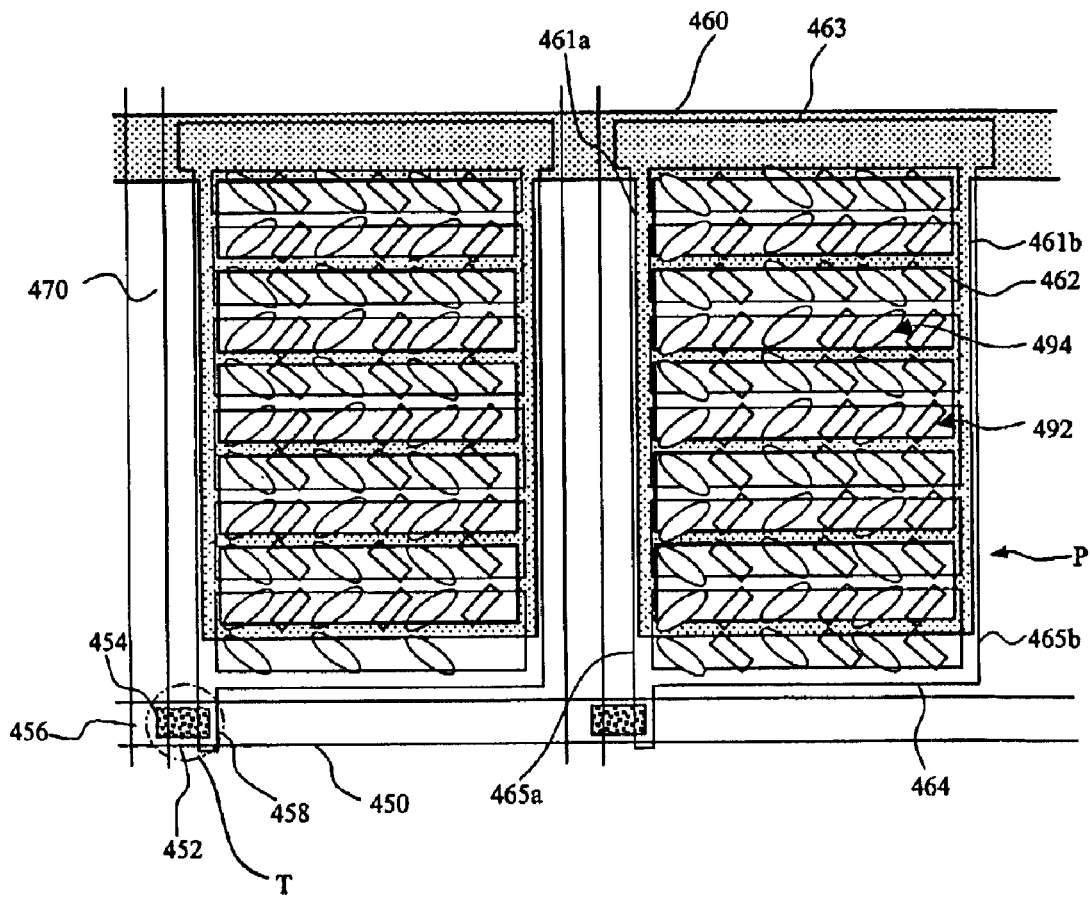
FIG. 19 is a plan view of an array substrate for a in-plane switching liquid crystal display (LCD) device according to a fourth embodiment of the present invention.

FIG. 19 is a plan view of an array substrate for an in-plane switching liquid crystal display (IPS LCD) device according to a fourth embodiment of the present invention. In FIG. 19, a gate line 450 is formed horizontally in the context of the figure. A data line 470 extends vertically in the context of the figure and crosses the gate line 450 to define a pixel area "P". At the crossing of the gate line 450 and the data line 470, a thin film transistor "T" is formed, which includes a gate electrode 452, a source electrode 456, and a drain electrode 458. Here, the gate electrode 452 is a part of the gate line 450 and the source electrode 456 is a part of the data line 470. An active layer 454 is formed at the crossing.

Next, a common line 460 parallel to the gate line 450 is formed, and a first vertical part 461a and a vertical second part 461b are extended vertically from the common line 460. In the pixel area "P", a plurality of common electrodes 462 is formed horizontally in the context of the figure spaced from each other. The plurality of common electrodes 462 are connected to the first and second vertical parts 461a and 461b. Also, a horizontal part 463, a plurality of pixel electrodes 464, a third vertical part 465a, and a fourth vertical part 465b are formed. The horizontal part 463 is parallel to the common line 460 and overlaps the common line 460. The third and fourth vertical parts 465a and 465b are extended from the common line 460, and the plurality of pixel electrodes 464, which are connected to the third and fourth vertical parts 465a and 465b, are formed horizontally in the context of the figure with an alternating arrangement with the plurality of the common electrodes 462. The third vertical part 465a is connected to the drain electrode 458.

Next, an overcoat layer (not shown) covers the plurality of common electrodes 462 and the plurality of pixel electrodes 464. The overcoat layer has holes 492 of a shape such as a quadrangle. The overcoat layer may be made of a photosensitive material such as benzocyclobutene (BCB) or acrylic resin. The holes 492 are disposed between the common electrodes 462 and the pixel electrodes 464, and have a length along a first direction and a width. Here, the first direction is inclined with respect to the common electrodes 462 and the pixel electrodes 464. The holes 492 are substantially symmetric with respect to the pixel electrodes 464 and the common electrodes 462.

Subsequently, liquid crystal 494 is situated over the overcoat layer, and the liquid crystal 494 has positive dielectric anisotropy. The liquid crystal 494 was first arranged in a direction of the common electrode 462 and the pixel electrode 464, but it is not shown in FIG. 19.

In FIG. 19, when voltage is applied to the common and pixel electrodes 462 and 464, electric field is induced in a direction parallel to the first direction between the common and pixel electrodes 462 and 464, and the liquid crystal 494 is arranged in a direction of the electric field, that is in the first direction.

Figure 20:
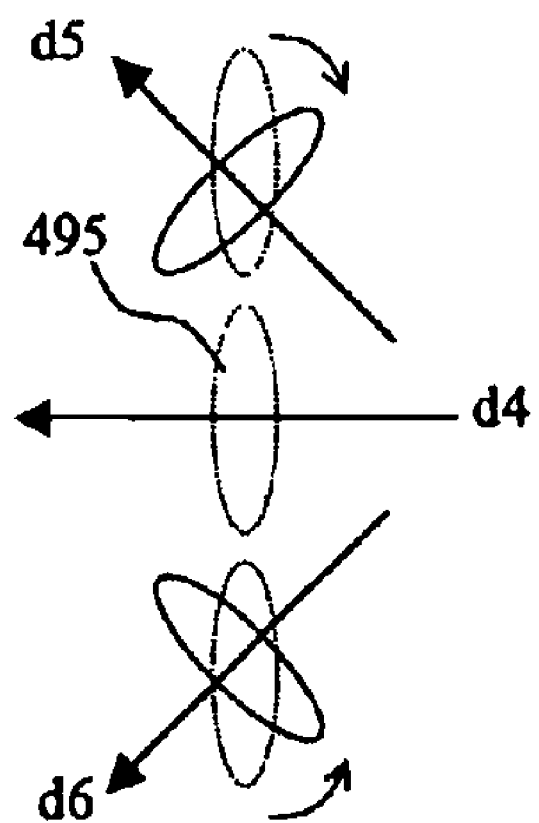
FIG. 20 is a schematic view showing the relationship between the electric field and the liquid crystal of a fourth embodiment of the present invention.

FIG. 20 shows the relationship between the electric field and the liquid crystal in the fourth embodiment. Here, the liquid crystal has negative dielectric anisotropy. A first arrow $d_4$ corresponds to the common electrode 462 or the pixel electrode 464 having a hole 492 of FIG. 19 thereon. A second arrow $d_5$ and a third arrow $d_6$ show directions of the electric field induced substantially symmetrically with respect to the first arrow $d_4$. Therefore, when voltage is applied to the electrodes 462 and 464, the liquid crystal 495, which first is perpendicular to the first arrow $d_4$, is arranged in a direction perpendicular to the second and third arrows $d_5$ and $d_6$.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:

a substrate;

a gate line and a data line on the substrate, the gate line and the data line crossing each other to define a pixel region;

a thin film transistor being electrically connected to the gate line and the data line;

a common line parallel to the gate line;

a plurality of common electrodes perpendicularly extended from the common line;

a gate insulator formed over said common electrode;

a plurality of pixel electrodes formed on the gate insulator and alternating with the plurality of common electrodes; and an overcoat layer over the plurality of common and pixel electrodes, the overcoat layer having a plurality of holes exposing a portion of the gate insulator, wherein the plurality of holes are over the plurality of common and pixel electrodes, wherein the plurality of holes over the plurality of common electrodes form a first line and the plurality of holes over the plurality of pixel electrodes form a second line, the plurality of holes of the first line being spaced apart from the plurality of holes of the second line.

2. The array substrate according to claim 1, further comprising a liquid crystal layer over the overcoat layer, the overcoat layer having a smaller dielectric constant than the liquid crystal layer.

3. The array substrate according to claim 1, wherein each hole has a shape of one of a circle, a triangle, a quadrangle, and a hexagon.

4. The array substrate according to claim 1, wherein the plurality of holes are formed between each of the plurality of common electrodes or each of the plurality of pixel electrodes.

5. The array substrate according to claim 4, wherein the plurality of holes have a length along a first direction and a width, the first direction being inclined with respect to the plurality of common and pixel electrodes.

6. The array substrate according to claim 5, wherein the plurality of holes between each of the pixel electrodes are substantially symmetric with respect to each other.

7. The array substrate according to claim 1, further comprising a liquid crystal layer over the overcoat layer, the liquid crystal layer having one of positive dielectric anisotropy and negative dielectric anisotropy.

8. The array substrate according to claim 1, wherein the overcoat layer is made of one of benzocyclobutene and acrylic resin.

9. An array substrate for an in-plane switching liquid crystal display device, comprising:

a substrate;

a gate line and a data line on the substrate, the gate line and the data line crossing each other to define a pixel region;

a thin film transistor being electrically connected to the gate line and the data line;

a common line parallel to the gate line;

a plurality of common electrodes parallel to the common line, the plurality of common electrodes being electrically connected to the common line;

a gate insulator formed over said common electrode;

a plurality of pixel electrodes formed on the gate insulator and alternating with the plurality of common electrodes; and an overcoat layer over the plurality of common and pixel electrodes, the overcoat layer having a plurality of holes exposing a portion of the gate insulator, wherein the plurality of holes are over the plurality of common and pixel electrodes wherein the plurality of holes over the plurality of common electrodes form a first line and the plurality of holes over the plurality of pixel electrodes form a second line, the plurality of holes of the first line being spaced apart from the plurality of holes of the second line.

10. The array substrate according to claim 9, further comprising a liquid crystal layer over the overcoat layer, the overcoat layer having a smaller dielectric constant than the liquid crystal layer.

11. The array substrate according to claim 9, wherein each hole is a shape of one of a circle, a triangle, a quadrangle, and a hexagon.

12. The array substrate according to claim 9, wherein the plurality of holes are formed between each of the plurality of common or each of the plurality of pixel electrodes.

13. The array substrate according to claim 12, wherein the plurality of holes have a length along a first direction and a width, the first direction being inclined with respect to the plurality of common and pixel electrodes.

14. The array substrate according to claim 13, wherein the plurality of holes between each of the pixel electrodes are substantially symmetric with respect to each other.

15. The array substrate according to claim 9, further comprising a liquid crystal layer over the overcoat layer, the liquid crystal layer having one of positive dielectric anisotropy and negative dielectric anisotropy.

16. The array substrate according to claim 9, wherein the overcoat layer is made of one of benzocyclobutene and acrylic resin.

* * * * *